Sept. 6, 1955  H. KELEM  2,716,751
MACHINE FOR BANDING MEAT CASINGS
Filed Sept. 17, 1954  3 Sheets-Sheet 2
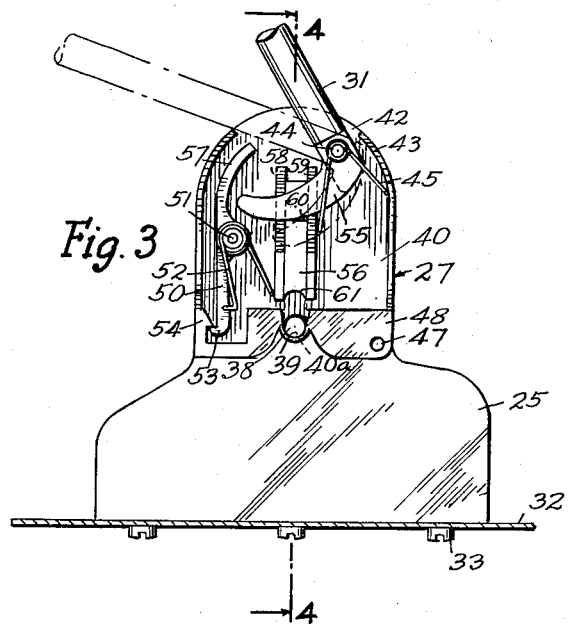
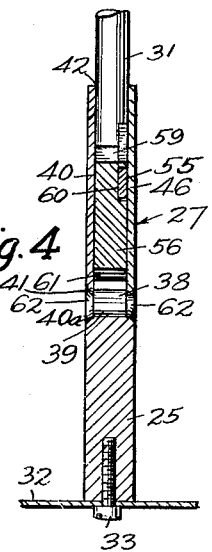
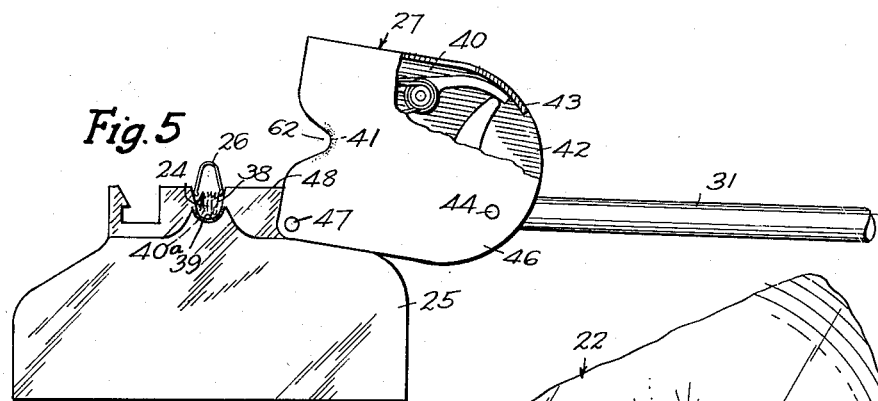
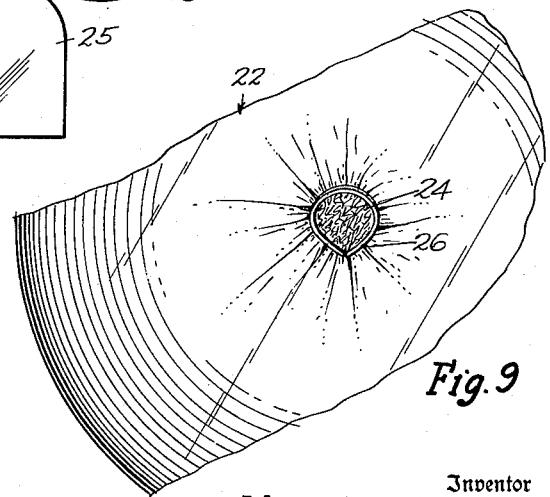
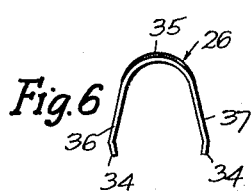
Inventor
Howard Kelem
By
Harry Jacobson
Attorney Sept. 6, 1955          H. KELEM          2,716,751
MACHINE FOR BANDING MEAT CASINGS
Filed Sept. 17, 1954          3 Sheets-Sheet 3
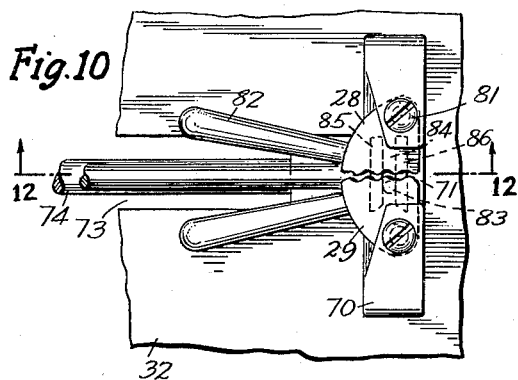
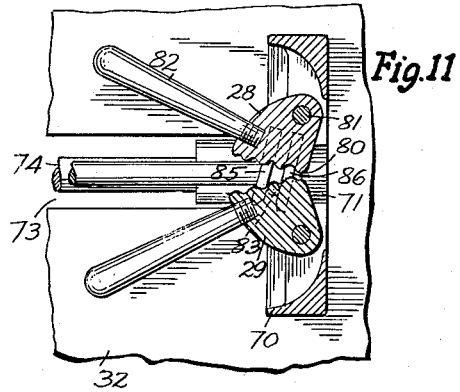
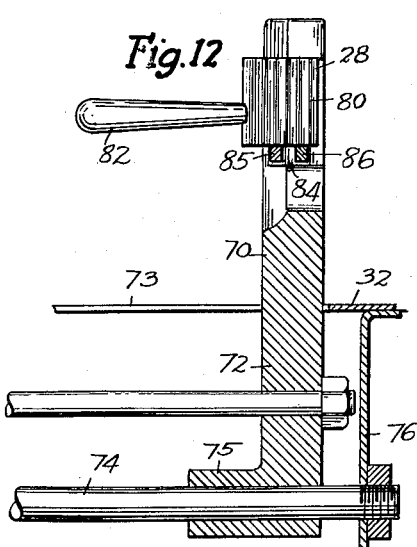
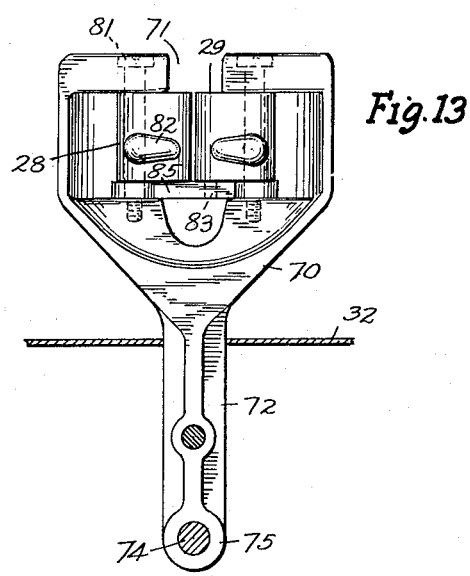
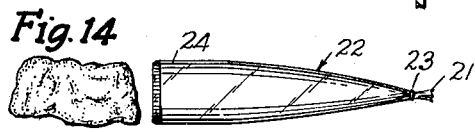
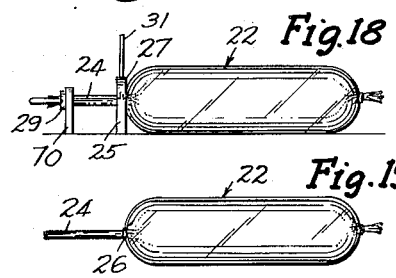
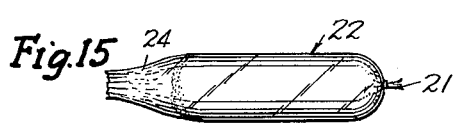
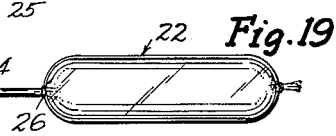
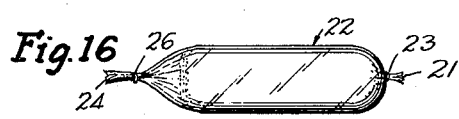
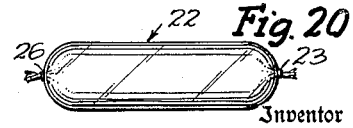
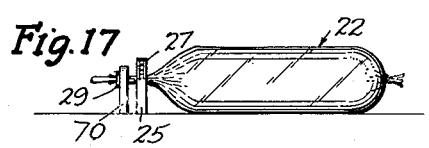
Inventor
Howard Kelem
Harry Jacobson
Attorney

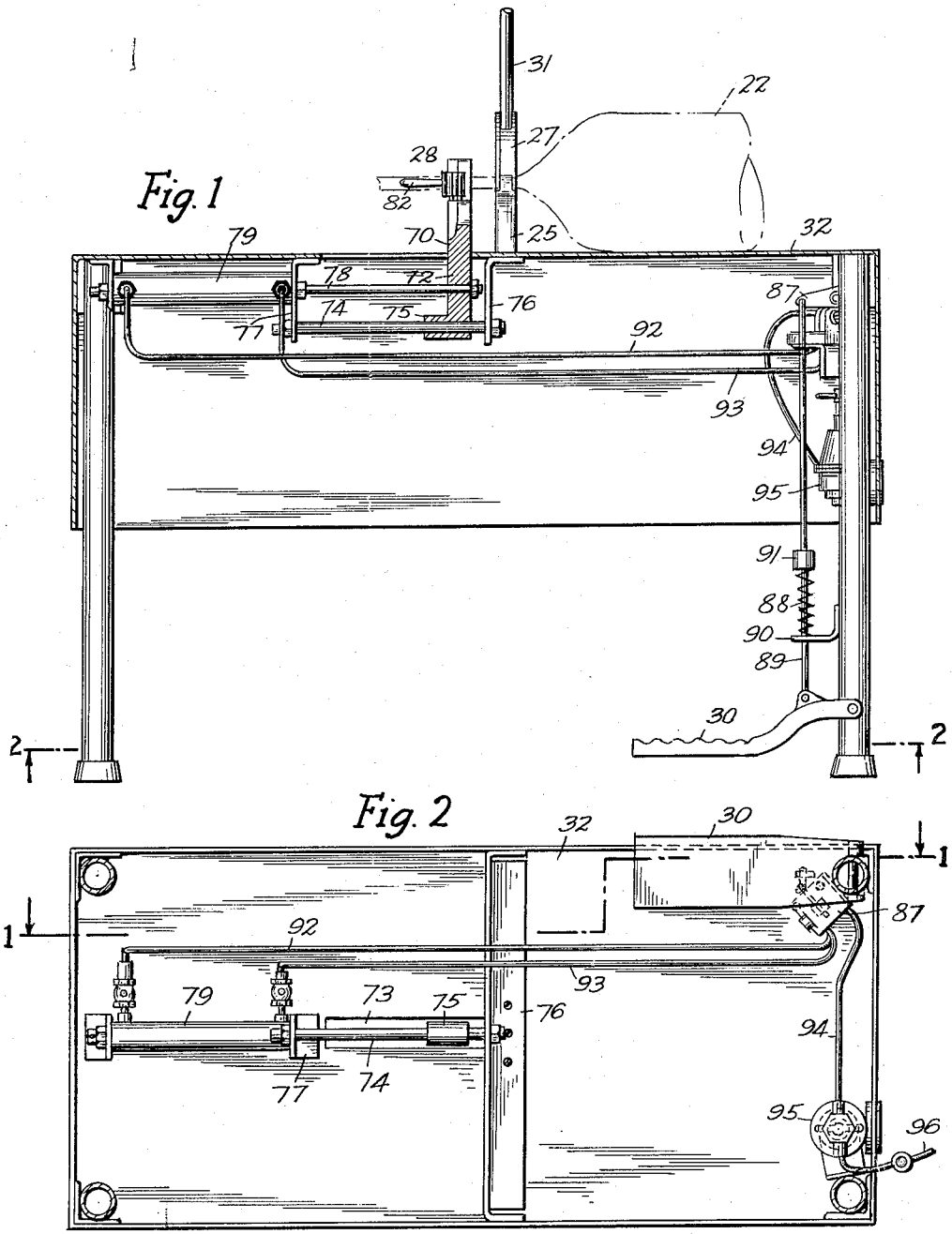

United States Patent Office 2,716,751
Patented Sept. 6, 1955

2,716,751

MACHINE FOR BANDING MEAT CASINGS

Howard Kelem, Far Rockaway, N. Y.

Application September 17, 1954, Serial No. 456,714

8 Claims. (Cl. 1—215)

This invention relates to machines for completing the stuffing of meat casings and sealing the ends of a stuffed casing with deformable metallic fasteners, and relates particularly to the means for holding and manipulating the casing, the fasteners, and the parts of the machine to effect compacting of the meat and the sealing of the casing at both ends.

The invention contemplates the provision of a relatively simple but effective mechanism including means operative to pull one crimped end part of a stuffed casing through a fixed slotted anvil, said crimped part being inserted into the slot by a downward movement independently of the banding fastener said mechanism further including means pivoted to the anvil on one side of the slot to drive an inverted U-shaped fastener, the fastener being inserted into the slot above the crimped part of the casing. Said mechanism drives the fastener, first downwardly into the lower part of the slot to arrange the sides of the fastener alongside the crimped part of the casing and then the mechanism bends said sides of the fastener around the crimped part thereby to band the casing.

The invention further contemplates the provision of simple means for locking the fastener-clinching mechanism to the anvil during the casing-pulling, meat-compacting and fastener-clinching operations, the locking means being releasable to permit movement of the driving mechanism relatively to the anvil on slight reverse movement of the operating lever or handle.

The invention further contemplates the provision of efficient casing pulling and banding mechanism adapted for manipulation and complete control by a single operator whose hands are free to operate the mechanism or to hold the casing as may be necessary.

The various objects of the invention will be clear from the description which follows and from the drawings, in which:

Fig. 1 is a partial side elevational view of the machine and partial vertical sectional view thereof taken on the line 1—1 of Fig. 2.

Fig. 2 is a combined bottom plan view and horizontal sectional view taken on the line 2—2 of Fig. 1.

Fig. 3 is a rear elevational view of the combined fixed anvil and attached fastener-driving mechanism, the rear plate having been removed, and showing the driver and the driver-operating means, the clinching positions of the parts being shown in dash-dot lines.

Fig. 4 is a vertical sectional view taken on the line 4—4 of Fig. 3.

Fig. 5 is an elevational view similar to Fig. 3 of the anvil and driving mechanism in the inoperative position of the latter wherein said mechanism is removed from its operative position above the anvil slot and the top of said slot is completely open to permit the casing and fastener to be inserted thereinto, the fastener being shown inserted in inverted position in the upper part of the anvil slot and there held frictionally.

Fig. 6 is a front elevational view of a now preferred form of band fastener of generally inverted U-shaped form.

Fig. 7 is a top plan view of the fastener.

Fig. 8 is a side elevational view of Fig. 6.

Fig. 9 is a fragmentary rear elevational view of the banded casing.

Fig. 10 is a top plan view of the casing-gripping jaws and the supports and guides therefor in the closed positions thereof.

Fig. 11 is a horizontal sectional view of the jaws and the supports and guides therefor in the open position of the jaws.

Fig. 12 is a vertical sectional view of the same taken on the line 12—12 of Fig. 10.

Fig. 13 is a front elevational view of the same.

Fig. 14 is a side elevational view of an empty meat casing showing one end thereof sealed and the casing ready to be stuffed with meat such as a boneless ham.

Figs. 15–20 are similar views of the casing showing the steps in pulling and sealing the other end of the casing and removing the excess crimped part.

As has been indicated, the machine is used to seal one crimped end portion 21 of an empty meat casing 22 by means of a suitable band fastener as 23 (Figs. 6–8 and 14) after which the meat is stuffed into the casing (Fig. 15), the other end portion 24 of the casing crimped, squeezed or crushed manually and pushed down to the bottom of a slot in the anvil 25 and a band fastener 26 pushed in an inverted position into the upper part of the anvil slot (Fig. 5). The crimped end 24 of the casing is then or previously inserted between the gripping jaws 28, 29 (Figs. 10 and 17) and the stapling head swung down over the anvil and locked to hold down the casing. The pedal 30 is then operated to move the jaws and thereby to pull the crimped part of the casing further through the anvil slot to tension the casing and to compact the meat therein (Fig. 18), the fastener being clinched thereafter (Fig. 19) by operation of the handle 31 of the stapling head 27 (Figs. 3–5). Release of the pedal causes the jaws to move back toward the anvil. The end 24 is now released from the jaws and the excess part of the end 24 cut off (Fig. 20) to complete the stuffed article.

As best seen in Fig. 1, the table top 32 fixedly supports the anvil 25 as by means of the screws 33 (Figs. 3–4) passing up through the top and into the base of the anvil. For banding purposes, a fastener of the open type such as the inverted U-shaped fastener 26 is preferably employed, having optionally serrated free end portions 34 converging toward each other, there being a substantially semi-cylindrical ribbed portion 35 integrally joining the slightly divergent sides 36, 37. This form of fastener is advantageous because the crimped end portion of the casing, when stuffed or empty, need not be threaded through a relatively small hole such as are found in closed or ring fasteners, but the fastener may be arranged in the anvil slot after the crimped casing end is in place in the lower part of the same slot.

Said anvil slot 38 (Figs. 3–5) extends downwardly from the top of the anvil sufficiently to receive easily the crimped end part 21 or 24 of the casing by a downward movement and also to receive the lower portion of the fastener 26 above and independently of the casing. The sides 39 of the slot preferably converge slightly downwardly and are engaged by the end portions 34 of the fastener as the fastener is pushed down into the slot, thereby to insure that the fastener is firmly held in the slot by friction. A suitably shaped wall forms the bottom of the slot and serves to bend the fastener portions 34 and the sides 36, 37 of the fastener toward each other respectively when pressure is exerted downwardly upon the portion 35 of the fastener in a manner soon to be described in detail, thereby to band the casing as shown in Fig. 9. Adjacent the bottom of the slot, the front wall 40 of the stapling head 27 is rounded as at 41 (Fig. 4) to present a tapered or converging entrance to the slot and to shape the stuffed casing without danger of cutting thereinto when the casing is later pulled through the slot. The front wall of the anvil around the edge of the slot 38 is similarly rounded as at 40a. The manually operable handle 31 passes through an opening 42 in the top part of the side wall 43 of the stapling head and is pivoted to the front wall 40 as at 44, the spring 45 on the pivot 44 urging the handle in a clockwise direction as viewed in Fig. 3 or away from the driving position. A rear plate 46 closes the hollow casing of the stapling head 27 formed by the walls 40 and 43 and protects the fastener-driving mechanism and the mechanism for locking the head, which mechanisms are arranged within the casing and are operated by the handle 31.

It will be noted (Fig. 4) that the head is swingable about the pivot 47, which is arranged transversely of and at one side of the anvil slot, to a position out of the way of the anvil slot so as to expose the top of said slot for easy insertion of the crimped casing end 21 or 24 thereinto separately from the fastener. For this purpose, the pivot 47 passes through the rear plate 46, through the upper part 48 of the anvil and through the front wall 40 of the head. The lower portions of the wall 40 and of the plate 46 embrace the upper part 48 of the anvil, which part is reduced in thickness to permit the corresponding front faces of the wall 40 and of the anvil to assume a coplanar position and similarly to permit the rear faces of the plate 46 and the anvil base to become coplanar, the part 48 entering the space in the head between the plate 46 and the wall 40 in the clinching position of the parts shown in Fig. 3.

In said position, the head is locked to the anvil automatically by means of the pawl 50 which is pivoted to the wall 40 as at 51 and pressed by the spring 52 in a clockwise direction as viewed in Fig. 3. The pawl terminates at its lower end in a tooth 53 adapted to snap into engagement with the fixed tooth 54 of the anvil as shown in Fig. 3 when the head 27 is swung by the handle in a counterclockwise direction into its operative position. A rotatable member in the form of an extension 55 on the handle has two functions. One is to release the pawl 50 on slight rotation of the handle in a clockwise direction and the other is to operate the fastener-driver 56 in a manner later to be described. The pawl 50 is provided with a projection 57 inclined into the arcuate path of movement of the free end of the extension 55 whereby the pawl is rotated against the action of the spring 52 in a counterclockwise direction on reverse movement of the handle 31, or away from the driving position. Such rotation of the pawl by the extension disengages the teeth 53 and 54 from each other and unlocks the stapling head for movement into its inoperative position shown in Fig. 5.

Slidably mounted for vertical movement in the parallel guides 58, 59 projecting rearwardly from the front wall 40 of the head, is the driver 56. The upper rear portions of the guides are cut away to permit the passage therepast and at the rear thereof, of the extension 55 as best seen in Fig. 4. Said extension enters the recess 60 of the driver 56 and reciprocates said driver upwardly and downwardly as the handle 31 is rotated clockwise and counterclockwise. The lower end edge 61 of the driver is concavely rounded to engage and exert pressure on the upper part 35 of the fastener 26, the driver being preferably projected beyond the lower edges of the guides when moved into the driving position thereof. To permit the passage of the crimped end portion 21 or 24 of the casing through the head for tensioning purposes, both the wall 40 and the plate 46 are slotted by similar slots as 62 extending upwardly from the lower edges of the wall and plate.

It will be noted (Fig. 4) that the fastener 26 projects above the top of the anvil part 48 when inserted into the anvil slot above the crimped casing end preparatory to the tensioning of the casing and the clinching of the fastener and that the fastener is self-held in the slot by reason of the resiliency of the sides 37 and 36 thereof, said sides tending to spread after being forced together by the sides of the slot engaged thereby and by reason of the friction between the sides of the fastener and the sides of the slot. Assuming that a crimped casing end is in the lower part of the anvil slot and that said end has been pulled as far as it can conveniently go through said slot and that the fastener 26 is in the upper part of the slot as shown in Fig. 5, movement of the handle 31 in the proper direction lowers the driver 56 and forces the fastener downwardly in the anvil slot. Such movement of the fastener first inserts the sides 36, 37 alongside of the crimped casing end between the casing and the walls of the anvil slot and as the movement is continued, bends the sides 36 and 37 of the fastener toward each other approximately into the position of Fig. 9 to band the casing.

No tensioning of the meat casing 22 is required merely for the clinching of the fastener 23, which is similar to the fastener 26, at one end as 21 of the empty casing. However, the case is otherwise when the fastener 26 at the other end is to be clinched. In that case, after the meat casing has been stuffed and the crimped open casing end passed downwardly into the anvil slot 38, the projecting part of said end 24 is secured in the gripping jaws 28, 29 and the jaws moved to pull the casing as has previously been indicated. As seen in Figs. 10–13, each of the jaws is substantially in the form of a quarter cylinder and is carried by a frame or bracket 70 having a slot or opening 71 therethrough passing downwardly from the top edge thereof to a point below the jaws for the passage of the crimped casing end. The bracket is provided with a downward extension 72 passing through a slot 73 in the table top and is mounted for sliding movement on the fixed guide rod 74 as by means of the elongated bearing 75. The guide rod is fixed at one end to the bracket 76 depending from the under side of the table top and at the other end is fixed to a similar bracket 77.

To reciprocate the jaw-carrying bracket 70, the piston rod 78 of an air cylinder 79 is suitably secured to the extension 72, air being admitted alternately to opposite sides of the piston within the cylinder under the control of the operator in a manner soon to be described. Each of the gripping jaws is serrated or corrugated on one upright face as 80 thereof and is eccentrically mounted on a vertical axis as 81 in the bracket 70 for oscillation therein, manually as by means of a suitable handle 82. Cooperating means on the jaws insures simultaneous movement of both jaws in opposite directions when the casing is to be gripped or released so that the operator need use only one hand to close or open the jaws. Said means comprises a slot and pin connection between the jaws, the pin 83 depending from the bottom face of the jaw 29 being arranged to move in the groove 84 between the two parallel downwardly projecting guides 85, 86 on the bottom of the other jaw 28. When the jaws are closed upon the crimped end 24 of the casing and the piston of the air cylinder 79 is operated to move the bracket 70 to the position shown in Fig. 18 away from the anvil 25, rearward movement of the fastener 26 is prevented by the lower portion of the plate 46 adjacent the slot 62 thereof and the crimped portion 24 of the casing is pulled by the moving jaws through the anvil slot 38. The space occupied by the meat within the casing is thereby decreased, the casing being pulled against and moving past the rounded portion 41 at the front face of the wall 40 of the head 27 and the similarly rounded portion 40a of the anvil, said portions 41 and 40a exerting compacting force on the contents of the casing through the outside of the casing as the jaws move, to shape the finished article and to prevent injury to the casing.

When the casing has been pulled sufficiently, the fastener 26 is clinched by operation of the handle 31 in the manner already explained. A foot pedal 30 controls the operation of the four-way valve 87 and the air cylinder 79 for the piston rod 78 and for the jaw bracket 72 the valve having the usual air supply port and relief outlet. In the normal or released position of the pedal shown in Fig. 1, the spring 88 on the pedal rod 89, acting against a fixed bracket 90 and against the collar 91 on the pedal rod, urges said rod upwardly to move the lever for the valve 87 into position to open the air supply port to the pipe 92 to close the supply port to the pipe 93 and to connect said pipe 93 to the relief outlet thereby to admit air to the rear of the cylinder 79 and to move the bracket 72 forwardly to the position shown in Fig. 1. The pipe 92 leads from the valve 87 to the rear end of the air cylinder while the pipe 93 leads to the front end thereof. Air is supplied to the valve 87 through the pipe 94 from the regulator valve 95 which is supplied from any suitable source through the pipe 96. When the pedal is depressed, the rod 89 is lowered, closing the supply port to the pipe 92, opening the relief outlet therefrom and opening the air supply port to the pipe 93 thereby admitting air to the front of the cylinder and moving the rod 78, the jaw bracket and the jaws 28, 29 rearwardly to stretch the casing. After the fastener-clinching operation is completed, the pedal 30 is released and the jaws moved automatically back toward the anvil ready for the repetition of the operation. Obviously, no pedal operation is performed for banding the empty casing as at 21, 23 (Fig. 14) the stapling head alone being then operated.

It will now be seen that I have provided a simple and relatively inexpensive machine for banding both ends of a meat casing and also for tensioning the stuffed casing and compacting the meat therein, that either end of the casing is quickly and easily inserted into the open slot independently of the banding fastener by a single movement and without the necessity for threading the casing through a hole, that a simple movement of the control handle locks or unlocks the stapling head and moves it into stapling position or out of the way of the anvil slot and that dependable banding is easily accomplished without danger of cutting or undesirably mutilating the casing.

While certain specific forms of the invention have herein been shown and described, various obvious changes may be made therein without departing from the spirit of the invention defined in the appended claims.

I claim:

1. In a machine for banding a meat casing, a fixed anvil having a slot extending downwardly from the upper edge thereof for the reception of the crimped end part of the casing and of sufficient height to extend above the crimped part inserted into the slot, a locking tooth on the anvil, a fastener-stapling head pivoted to the anvil for movement into a position to expose the top of the slot, a spring-pressed pawl carried by the head in position to engage the tooth of the anvil and to the lock the head releasably to the anvil, means carried by the head to exert downward pressure on a fastener inserted into the slot above and independently of the casing to drive the fastener along the anvil and about the crimped casing, the fastener-driving means comprising a manually operable lever pivoted to the head, a rotatable member associated with the lever, a fastener-driver mounted in the head and engaged by the member for reciprocation thereby, and an operative connection between the member and the pawl, said member being movable with the driver on operation of the lever in one direction to control the removal of the pawl from the tooth and thereby to unlock the head from the anvil.

2. In a machine for banding a meat casing by bending the free ends of an inverted U-shaped fastener toward each other and around the casing, an anvil having a slot therein open at the top thereof, the slot being of sufficient height to permit the casing in crimped form to be inserted into the lower part of the slot and to permit the free end portions of the fastener to be inserted into the upper part of the slot above the casing with the remainder of the fastener projecting out of the anvil slot, means for holding the crimped casing and the fastener within the slot and for driving the fastener comprising a stapling head pivoted to the anvil at a point in transverse spaced relation and on one side of the anvil slot, the head having laterally spaced apart front and rear walls, each of said walls having a slot therein extending laterally completely through the wall and also extending upwardly from the bottom edge of the wall, the head in its fastener-driving position being directly above and resting on the anvil, the lower part of each of the walls of the head overlapping respectively the corresponding wall of the anvil with the slots of the walls in substantial registration with the anvil slot, the upper part of the fastener entering the space between said walls of the head at the slots in said walls in the driving position of the head, the fastener-holding and driving means further comprising a driver between said walls and movable toward the bottom of the anvil slot to move the fastener downwardly until the sides of the fastener are alongside the casing and then to bend said sides toward each other and around the crimped casing.

3. In a machine for banding a meat casing by bending the free ends of an inverted U-shaped fastener toward each other and around the casing, an anvil having a slot therein open at the top thereof for the reception of the casing, as well as the lower parts of the legs of the fastener, means for holding the crimped casing and the fastener within the slot and for driving the fastener comprising a stapling head pivoted to the anvil and having a driver therein, and means controlled by the fastener-holding and driving means to lock the stapling head releasably to the anvil in position to hold down the crimped casing.

4. The machine of claim 3, the locking means comprising a spring-pressed pawl pivoted to the head, co-operating teeth on the pawl and the anvil, a manually operable lever having an operative connection to the driver and to the pawl to swing the pawl in a direction to disengage the teeth.

5. In a machine for banding a meat casing by bending the free ends of an inverted U-shaped fastener toward each other and around the casing, a fixed anvil having a slot therein for the reception of a crimped portion of the casing and for the reception of the fastener in inverted U-shaped position above and independently of the casing, means for gripping and pulling the crimped portion of the casing through the slot independently of the fastener, means for holding the casing in the slot while the casing-pulling means is operative comprising a fastener-driving head having a slot therein corresponding to the anvil slot and adapted to receive the upper part of the fastener, means for movably securing the head to the anvil whereby the head is movable toward and away from the anvil slot, means for removably locking the head to the anvil in fastener-driving position, and means for moving the fastener downwardly first to arrange the sides of the fastener in the lower part of the slot and alongside the casing and then to bend the sides of the fastener toward each other and around the casing.

6. The machine of claim 5, the fastener-moving means comprising a manually operable lever pivoted to the head and a reciprocable driver having an operative connection to the lever, and the locking means comprising inter-engaging members on the anvil and the head, and means controlled by the lever to disengage the member on the head from the member on the anvil on movement of the lever in a direction opposite to the direction of clinching movement of the lever.

7. In a machine for banding a meat casing by bending the sides of an inverted U-shaped fastener toward each other and around the casing and for compacting the meat in the casing, means for gripping and tensioning the casing including a pair of casing-gripping jaws, an anvil having a slot therein open at the top for the passage downwardly thereinto of a crimped portion of the casing independently of the fastener, means for relatively moving the jaws and the anvil toward and from each other, a stapling head carried by the anvil to close the top of the anvil slot and thereby to hold the crimped portion of the casing down in the slot, a pivot for the head entering the anvil on one side of the slot whereby the head is mounted to swing in a plane parallel to the faces of the anvil, the slot being of sufficient height to receive the lower portions of the sides of the fastener frictionally therein and above the crimped casing portion, the lower part of the head embracing and overlapping the upper parts of the faces of the anvil when the head is swung about the pivot into a position to close the top of the slot, said lower part of the head having a slot therethrough registering with the anvil slot in said position of the head, and means on the head first to drive the fastener downwardly until the sides of the fastener are alongside the crimped portion of the casing and then to bend the sides to embrace said portion including a manually operable lever pivoted to the head and a reciprocable fastener-driver having an operative connection to the lever.

8. The machine of claim 7, means to lock the head releasably to the anvil comprising a spring-pressed pivoted pawl and a projection on the anvil engageable by the pawl, and means to release the pawl comprising a member controlled by the lever and movable into engagement with the pawl to move the pawl out of engagement with the projection on movement of the driver by the lever.

References Cited in the file of this patent

UNITED STATES PATENTS

| 191,100 | Braukman et al. | May 22, 1877 |
| 822,527 | Koppel | June 5, 1906 |
| 1,963,306 | Maynard | June 19, 1934 |
| 2,073,958 | Crosby | Mar. 16, 1937 |
| 2,194,313 | Loomis | Mar. 19, 1940 |
| 2,311,643 | Crosby | Feb. 23, 1943 |
| 2,325,769 | Haag | Aug. 3, 1943 |
| 2,685,394 | Rabinowitz | Aug. 3, 1954 |

FOREIGN PATENTS

| 288,891 | Germany | Nov. 23, 1915 |
| 461,395 | France | Dec. 27, 1913 |